May 21, 1940.  A. B. REICH  2,201,454
SURFACE PLATE ASSEMBLY
Filed March 22, 1939  7 Sheets-Sheet 1

INVENTOR
Albert B. Reich
BY
Henry G. Dylvig
ATTORNEY

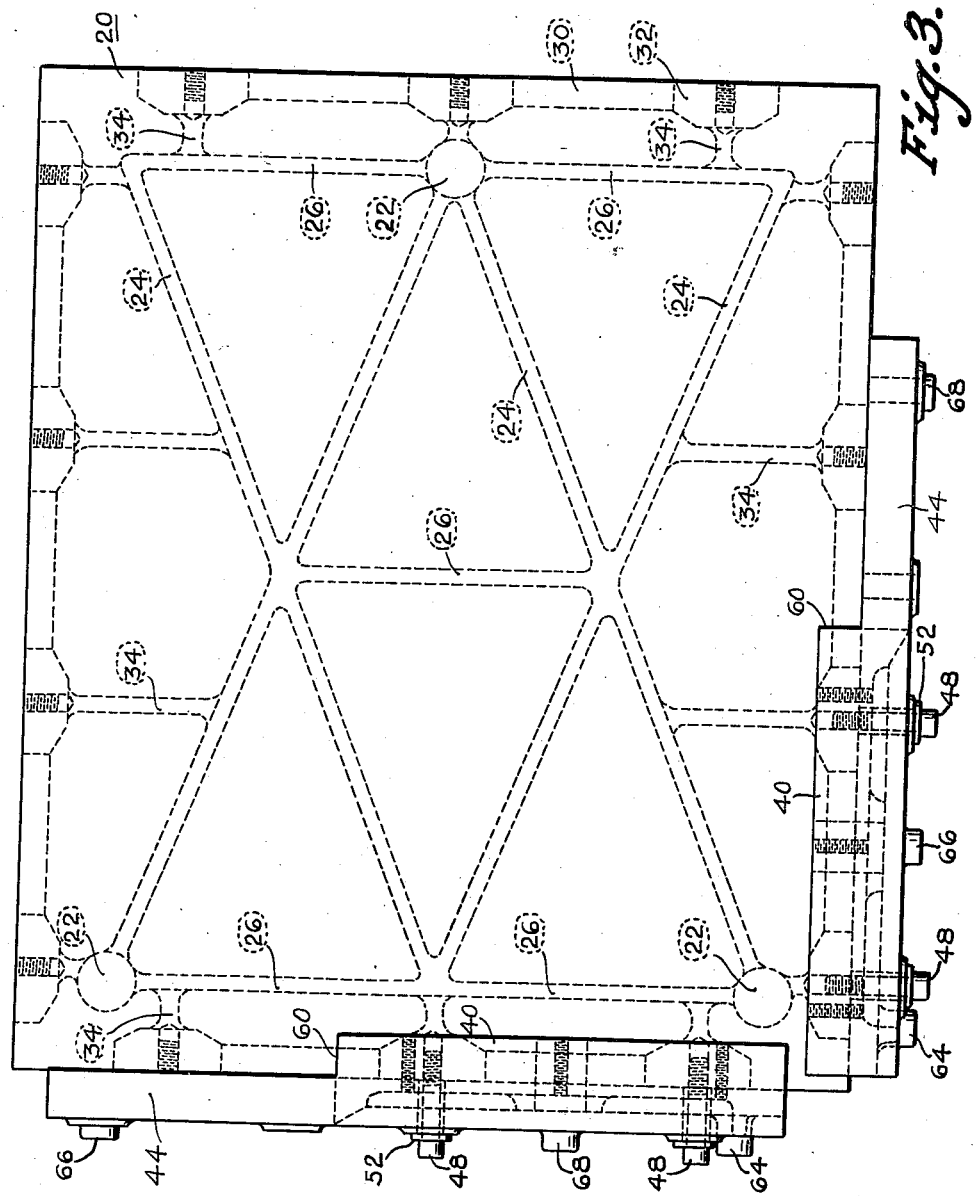

May 21, 1940.  A. B. REICH  2,201,454
SURFACE PLATE ASSEMBLY
Filed March 22, 1939   7 Sheets-Sheet 3
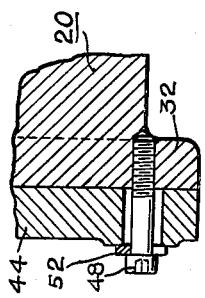
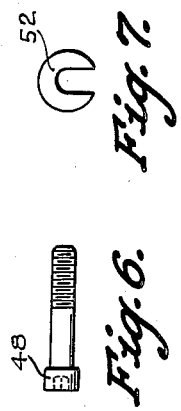
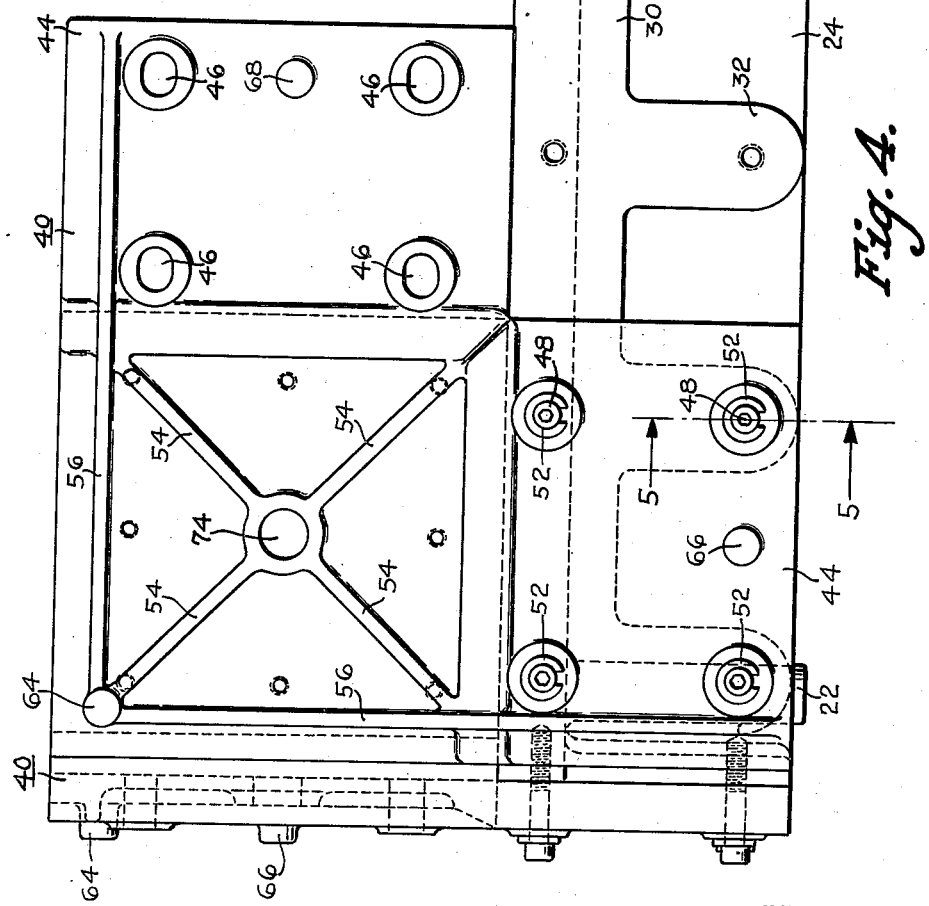
INVENTOR
Albert B. Reich
BY
Henry G. Dybvig
ATTORNEY

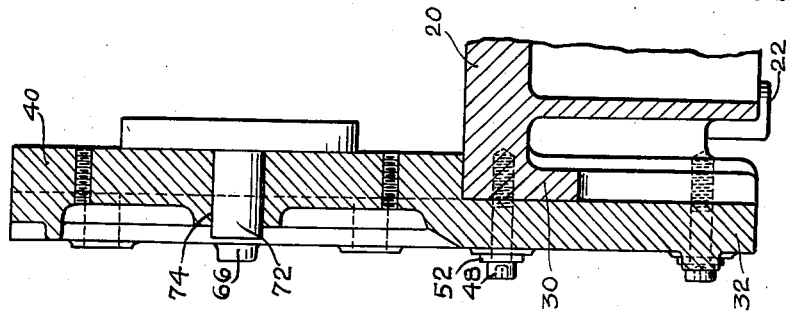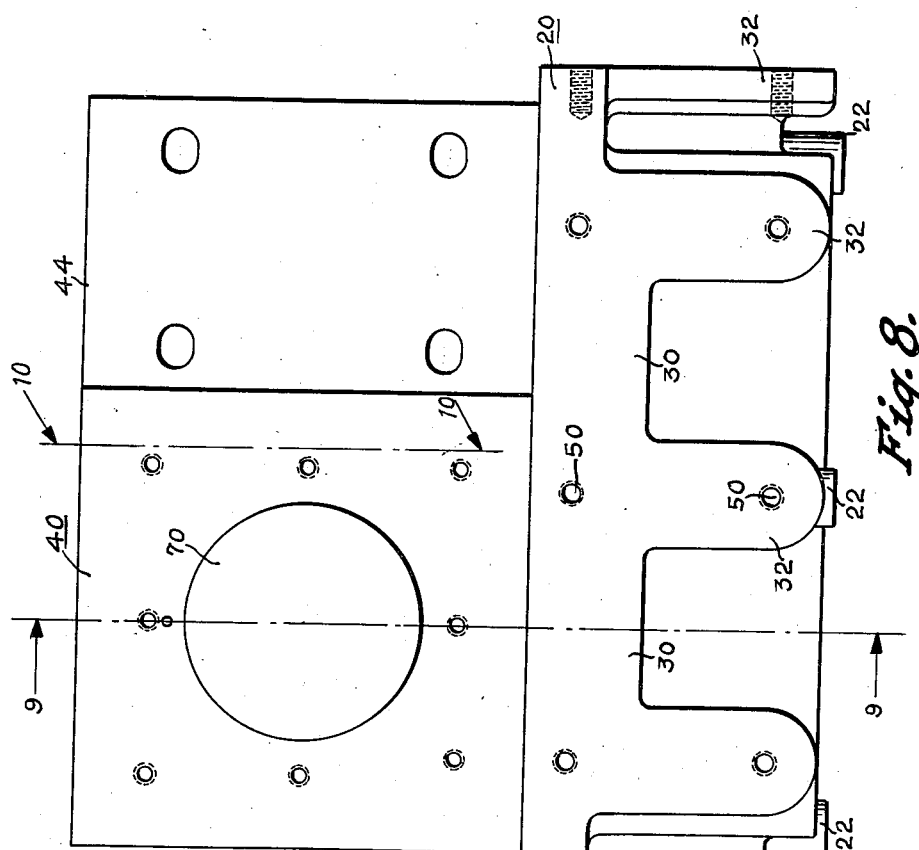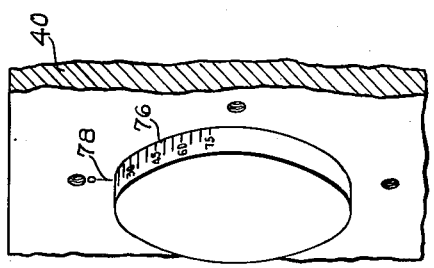

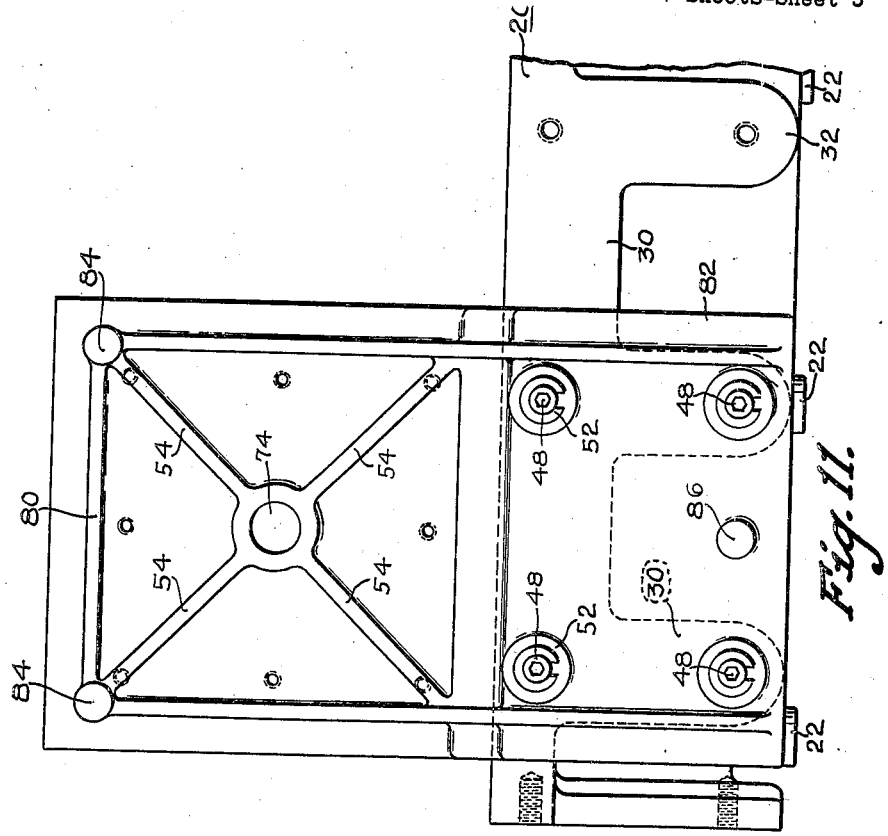
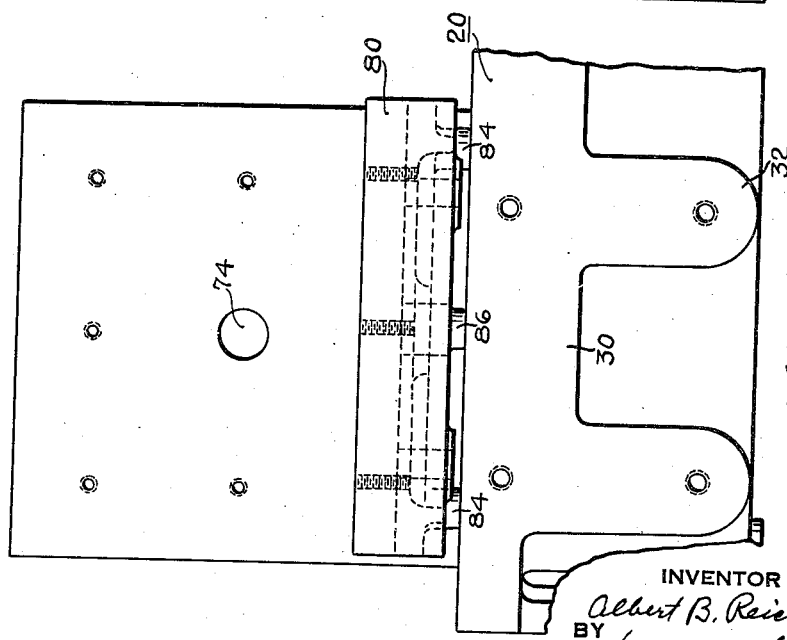

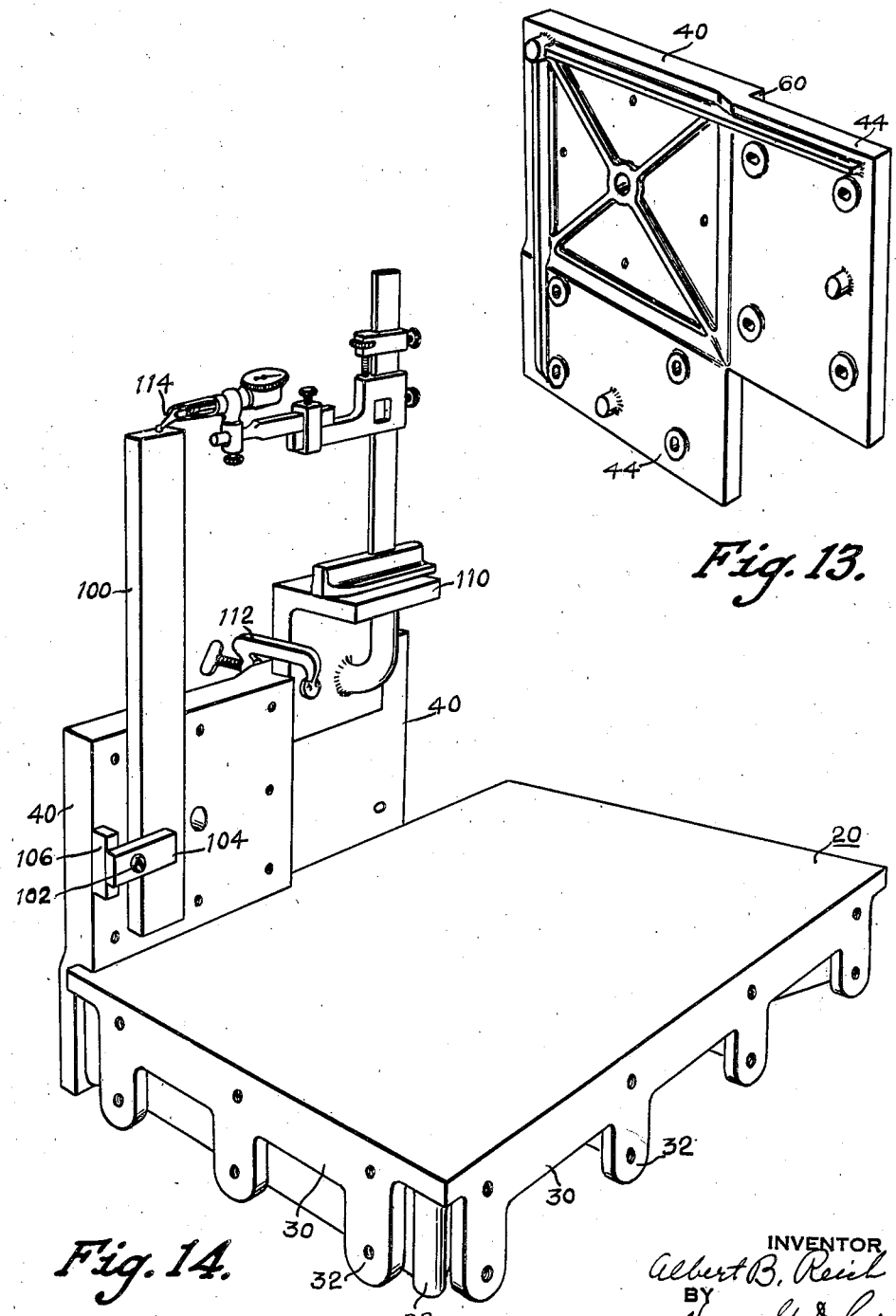

May 21, 1940.                    A. B. REICH                    2,201,454
                          SURFACE PLATE ASSEMBLY
                          Filed March 22, 1939           7 Sheets-Sheet 7
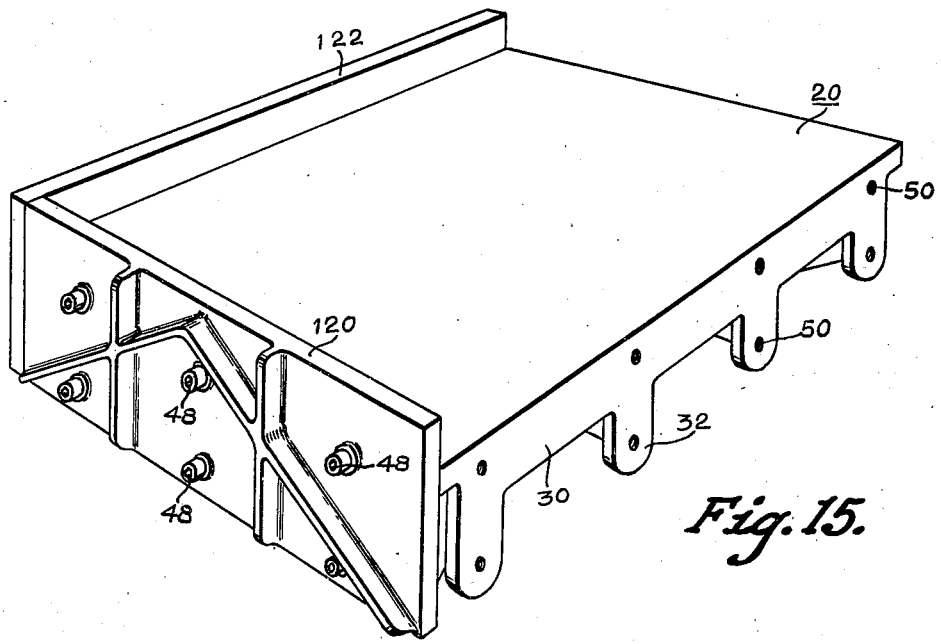
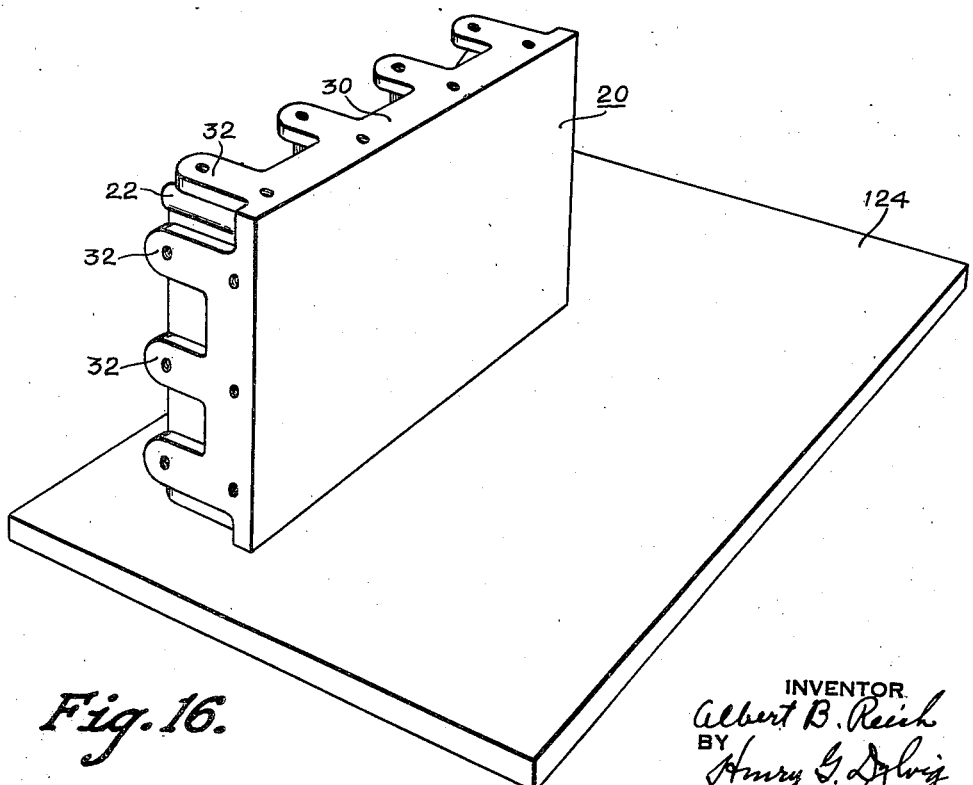
INVENTOR.
Albert B. Reich
BY
Henry G. Dylvig
ATTORNEY Patented May 21, 1940

2,201,454

UNITED STATES PATENT OFFICE 2,201,454

SURFACE PLATE ASSEMBLY

Albert B. Reich, Dayton, Ohio

Application March 22, 1939, Serial No. 263,463

10 Claims. (Cl. 33—174)

This invention relates to a surface plate assembly and more particularly to the construction of the surface plate and the angle brackets therefor.

Tool makers, die makers, precision instrument makers, testing laboratories, industrial inspection departments et cetera, utilize surface plates in manufacturing, checking testing and measuring various articles of manufacture, which surface plates may or may not be provided with angle irons or angle brackets for determining the accuracy and the precision of the article.

An object of this invention is to provide a surface plate that is convenient to use, accurate, occupying a small space as compared with the surface area that is available for use, that is easily manufactured, but at the same time dependable.

Another object of this invention is to provide an angle bracket that may readily be mounted in position along any side of the surface plate with a small amount of labor and at the same time forming a right angle with the work surface of the main surface plate.

Another object of this invention is to provide a surface plate adapted to have an angle bracket or several angle brackets attached to the side or sides thereof.

Other objects and advantages reside in the construction of parts, the combination thereof and the mode of operation, as will become more apparent from the following description.

In the drawings,

Figure 3 is a top plan view of a surface plate similar to the one shown in Figure 1, together with a pair of angle brackets.

Figure 4 is a side view of the surface plate and angle brackets shown in position.

Figure 5 is a fragmentary detail view, taken substantially on the line 5—5 of Figure 4.

Figure 6 is a plan view of the retaining pin shown in Figure 5.

Figure 7 is a detail view of a retaining member cooperating with the retaining pin or bolt shown in Figure 6 to hold the angle bracket in position.

Figure 8 is another side elevation showing another adaptation of the surface plate and the angle brackets associated therewith.

Figure 9 is a fragmentary, cross sectional view taken substantially on the line 9—9 of Figure 8.

Figure 10 is a fragmentary perspective view looking in the direction of the arrows 10—10 in Figure 8.

Figure 11 shows an angle bracket provided with a single wing.

Figure 12 shows an angle bracket similar to the one shown in Figure 11, positioned on top of the surface plate, so as to provide an auxiliary work surface in spaced relation from the work surface of the surface plate.

Figure 13 is a perspective view of the angle bracket shown in Figures 1, 3 and 4.

Figure 14 discloses the use of the angle bracket, wherein the abutment surface upon the angle bracket and the wing surface have been utilized in association with an attachment including a height gauge.

Figure 15 discloses a surface plate associated with a modified type of angle bracket structure.

Figure 1:
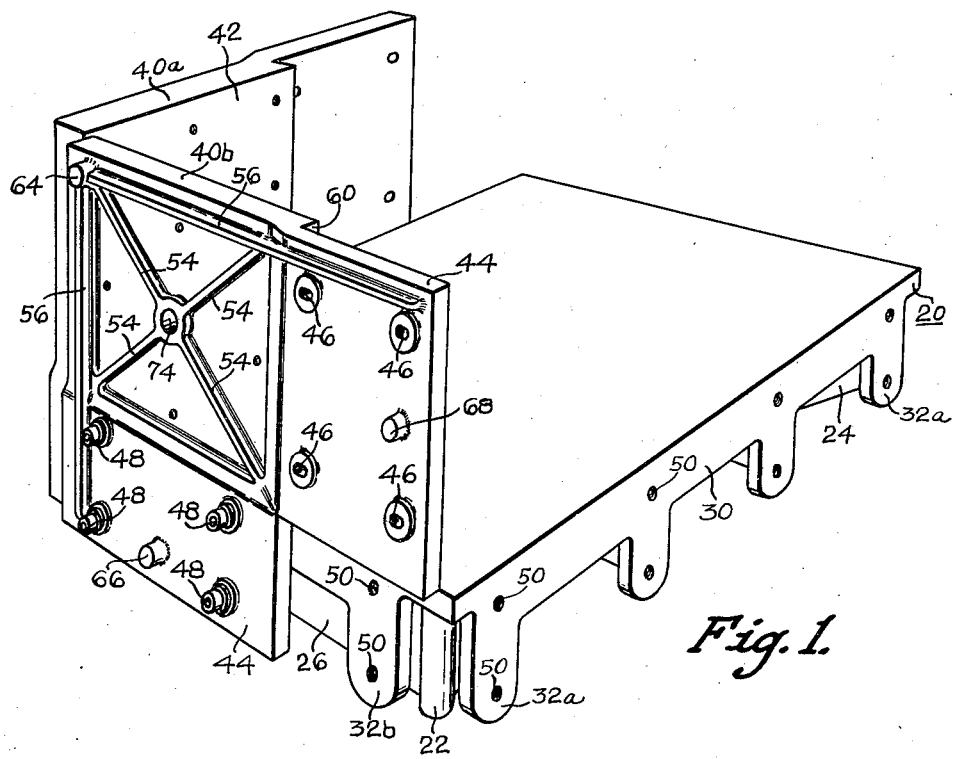
Figure 1 is a perspective view of a surface plate having attached thereto a pair of angle brackets disposed at right angles with respect to each other and presenting abutment surfaces at right angles with respect to each other and at right angles with respect to the work surface of the surface plate, so as to form a trihedral angle.
Figure 2:
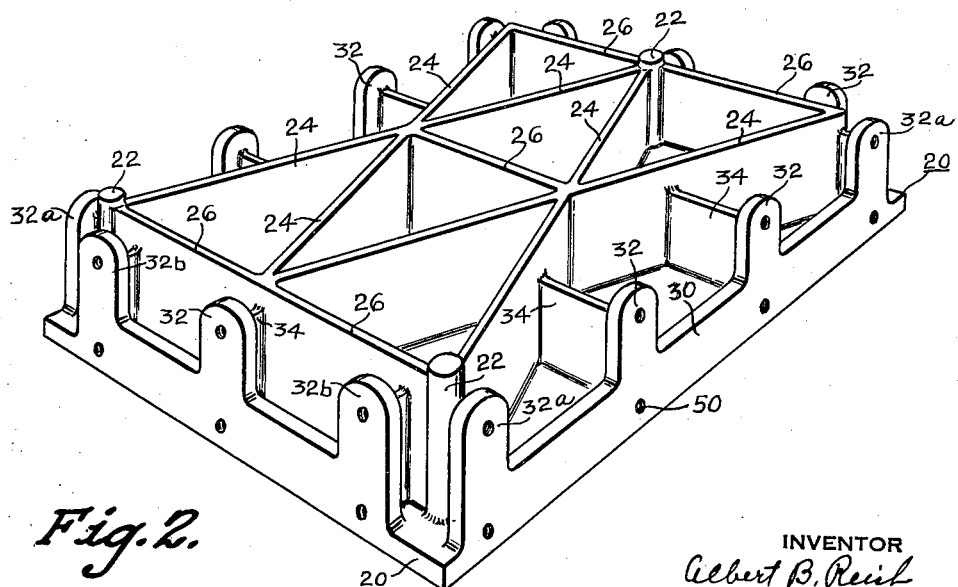
Figure 2 is a perspective view of the bottom of the surface plate inverted.

Figure 16 shows a surface plate like the surface plates shown in Figures 1 and 2, which has been placed on edge on a second surface plate, showing the use of the first surface plate substituted for an angle iron.

Surface plates are used quite extensively in various types of industries, especially where great accuracy in workmanship is essential. In the past, a surface plate has consisted of a plate presenting a flat surface, mounted on a tripod support and reenforced by a web-like truss network. When it has been desirable to measure an angle of 90° with the aid of a surface plate, it has been customary to place a heavy angle iron having flanges approximately eight inches in width upon the surface plate, preferably along one edge, so that the upwardly projecting flange forms a right angle with the surface of the plate. Unfortunately, however, this arrangement is objectionable, in that the angle iron may occupy nearly half, and sometimes more than half of the available surface area. For large work pieces it becomes necessary to either use a very large surface plate or to let the work project beyond the surface plate. The use of a large surface plate is objectionable, in that it requires much space, is extremely heavy and very expensive to produce or to purchase. The surface plates in the past have been made with a comparatively narrow edge, so that it has not been practical to mount an angle bracket upon the side of the surface plate, as the support is inadequate to obtain the desired accuracy. A slight flexing defeats the purpose of the assembly.

In the present embodiment the use of conventional angle irons clamped on top of the surface plate has been eliminated. Instead, the surface plate has been provided with a plurality of downwardly projecting bosses, having an outer surface that is flush with the surface edge of the surface plate, so that the bosses, together with the edge of the surface plate cooperate to form an excellent support for an angle bracket that has been provided for attachment to the surface plate. The number of downwardly projecting bosses depends entirely upon the size and dimensions of the surface plate and the use to which it is to be put. Each end of the surface plate may be provided with three bosses and the longitudinal sides of the surface plate with four or more bosses. These bosses are preferably so spaced that if two angle brackets are mounted adjacent the same corner of the surface plate, the angle brackets, so to speak, overlap each other slightly, so that the abutment surfaces of the angle brackets form right angles and practically a closed corner. Each of the angle brackets is preferably provided with two wings, one of which is used for supporting the angle bracket along the side of the surface plate, and the other extending in a direction parallel to the edge of the surface plate and parallel to the abutment surface, so that this other wing may for some purposes be used as a secondary abutment surface. The details of the structure will be more fully explained in connection with the showing that has been made in the drawings, which showing has been made for the purpose of illustration and not for the purpose of limitation.

Referring to the drawings, the surface plate assembly includes a surface plate 20 mounted upon a tripod support including three legs 22 interconnected by a web-like truss network including a plurality of diagonal webs 24 and the transverse webs 26. This web-like structure in addition to reenforcing the plate 20 cooperates to support this plate upon the supporting legs 22. The use of a tripod support and a web-like truss network for reenforcing the base of the surface plate is broadly old.

This surface plate 20 is provided with marginal flange portions 30, extending downwardly from the sides of the plate 20 and merging into a plurality of downwardly projecting bosses 32, as may best be seen by referring to Figure 2. The downwardly projecting bosses are connected by web portions 34 which extend to the supporting structure of the plate. These web portions 34 are sufficiently long so as to contact the web-like truss network, that is, some of the web portions 34 extend into engagement with the longitudinal webs 24, while some extend from the bosses 32 to the transverse webs 26 and the remaining web portions extend from the bosses 32 directly to the adjacent leg 22. The web portions 34 reenforce the bosses 32 and the flanges 30, so as to maintain the flange portions 30 and the bosses 32 in a fixed angular relation with respect to the top or work surface of the plate 20. The outer surface of the flange portions 30 and the bosses 32 on each side of the surface plate 20 lies in the same plane and forms right angles with the plane of the surface of the plate 20. Generally, it is the surface of the plate 20 that is utilized in manufacturing processes, in testing, in tool making, in precision work and the like. The top surface of the surface plate may be referred to as the work surface. The surface formed by the downwardly projecting flanges 30 and the bosses 32 does not usually enter into the direct utility of the surface plate; but is generally ancillary, merely a means to an end.

As already stated, it has been conventional practice in tool shops, testing laboratories and the like to mount an angle iron on the top of the surface plate with one of the flanges lying directly upon the work surface of the surface plate 20. Usually, a fairly large angle iron is used, the flanges may be eight inches or more in width. The flange facing or lying upon the surface of the plate is usually aligned with one of the edges of the surface plate. It may be clamped in position with suitable C-clamps. This arrangement is objectionable, in that the heavy angle irons will scratch or mar the surface of the surface plate if not carefully handled, which defeats the purpose of the surface plate to some extent, if not entirely. Furthermore, this angle iron is objectionable, in that it may occupy half or more of the available surface area, thus greatly reducing the useful surface area.

Instead of angle irons being located upon the top of the surface plate, one or more angle brackets 40 are attached to the sides of the surface plate. Each angle bracket 40 includes an abutment surface 42 and a pair of wings 44. As may best be seen by referring to Figure 4, the wings 44 are disposed along two adjacent sides of the main body portion of the angle bracket 40, so that the wings extend in directions at right angles to each other. In Figure 4 one wing extends downwardly from the main body portion and the other extends laterally to the right of the main body portion.

Each wing is provided with a plurality of holes 46 which are oblong in cross sectional area. In the particular embodiment shown there are four holes in each wing. The holes in the downwardly extending wings 44, as viewed in Figures 1 and 4, receive the retaining bolts 48, which clamp or secure the wing 44 in position on the surface plate. These bolts 48 extend into threaded apertures 50 in the downwardly projecting flanges 30 and the bosses 32. These bolts are preferably threaded, so as to threadedly engage the holes 50.

In order to facilitate and expedite the mounting and removal of the angle brackets from the surface plate 20, the bolts 48 are preferably provided with round heads, sufficiently small so as to be passed through the holes 46 without removal of the bolts from the flanges 30 and the bosses 32. In order to prevent the bolts 48 from slipping through the holes 46 when the angle bracket 40 is clamped in position, retaining members 52, horseshoe-like or C-shaped, are slipped over the bolts 48 and form abutment members or clamping members, permitting the bolts 48 to rigidly clamp the angle bracket 40 in position on the side of the surface plate.

By referring to Figure 4 it can be readily seen that the angle bracket 40 has been mounted with the abutment surface 42 located to the left of the surface plate 20. For some types of work it might be desirable to have the abutment surface located towards the right of the surface plate. This may be accomplished by removing the angle bracket from the position shown in Figure 4, rotating the angle bracket as viewed in Figure 4 in a clockwise direction through an angle of 90°, so as to cause the wing 44 now extending from the right of the abutment surface to overlap the bosses shown to the right of Figure 6, at which time the other wing extends parallel to the work surface and projects to the left, as viewed in Figure 4. By using two wings disposed at right angles with respect to each other, this arrangement of the angle bracket, either to the left or to the right of the surface plate, is made possible.

As may best be seen by referring to Figure 1, the outside of the abutment surface 42 is provided with diagonally disposed webs or ribs 54, reenforcing this portion of the angle bracket. A pair of ribs 56 extend along two sides and to the rear of the abutment surface and to the rear and on the outside of the wing portions 44. These ribs reenforce and strengthen the angle bracket structure. The inner surface, or the contacting surface of the wings 44, is seated against the surface of the flanges 30 and the bosses 32, while the abutment surface is offset from this contacting surface, so as to provide a pair of shoulders 60, one between each wing and the abutment surface 42. This shoulder 60, which extends along the bottom of the abutment surface 42, rests in contact with the surface of the plate 20. The abutment surface 42, as well as the surfaces of the wings 44, extend at right angles to the work surface of the surface plate 20.

By referring to Figures 1 and 2, it can readily be seen that the bosses 32a are mounted nearer to the corners of the surface plate than are the bosses 32b. The bosses 32a in the particular modification disclosed, are mounted under the longer side, or the longer edge, of the surface plate 20. There are four bosses on this side. There are only three bosses on the shorter side. By having the bosses 32b located further from the corner than the bosses 32a, it is possible to mount two angle brackets, one attached to the long side and one to the short side of the surface plate, in such a manner that the corners of the angle bracket overlap. By referring to Figure 1 it can readily be seen that the left hand corner of the angle bracket 40b overlaps the abutment surface 42 of the angle bracket 40a. This results in the formation of a trihedral angle. This arrangement has been made possible by mounting the bosses in different spaced relation from the corners of the surface plate. By referring to Figure 3, the dimensions have been so chosen that the two angle brackets do not completely close the corner. This is a matter of choice of dimensions. The construction and arrangement of parts are such that the surface plate assembly lends itself to an open or a closed corner.

Referring to Figures 8, 9 and 10, the angle bracket 40 supports a disc 70, integral with a pintle 72, seated in the aperture 74 in the bracket 40. This disc-like member 70 is provided with a graduated periphery 76 having the indicia thereon registering with an indicant 78 engraved into the abutment face of the bracket 40. The graduations on this disc-like member 70 may be in degrees, in percent or any other suitable designation. By this arrangement it is very easy and convenient to measure angles and the like upon the work piece.

As will appear more fully later, the angle brackets 40 are not confined in their use as angle brackets. These may be used as auxiliary surface plates, in that these angle brackets have been provided with tripod supporting means including the three legs 64, 66 and 68. The outer surfaces of the legs 64, 66 and 68 lie in a common plane that is parallel to the plane formed by the abutment surface of the same angle bracket and the inner plane of each of the wings.

In the modification disclosed in Figures 11 and 12, an angle bracket 80 has been shown which has been provided with one wing 82. This angle bracket in other respects is similar to the one already described. It is provided with a tripod support including the legs 84 formed on the corners of the main body portion and the leg 86 carried by the wing 82. The wing 82 overlaps the downwardly projecting bosses 32 and is secured in position in the same manner as are the wings 44, which have already been described.

This angle bracket 80 or the angle bracket 40, when removed from the side of the surface plate, may be used as an auxiliary surface plate, by merely supporting the angle bracket upon the work surface of the surface plate. The outer surfaces of the tripod supporting means of the angle bracket 40 and the angle bracket 80 are parallel to and equidistant from the abutment surface. Thus, by mounting the angle bracket upon the work surface of the surface plate, the abutment surface of the angle bracket and the wing surface of the angle bracket are parallel to the work surface of the surface plate. This arrangement is convenient in measuring heights, thicknesses of the work and otherwise, as deemed necessary by the mechanic.

In Figure 14 the surface plate 20 supports the angle bracket 40, having mounted thereon a work piece 100 clamped against the abutment surface of the angle bracket 40 by a suitable bolt 102 extending through one of the holes in the angle bracket 40 and engaging the clamp 104 having one end contacting the work piece 100 and the opposite end resting upon a suitable block 106. The wing 44 supports a height gauge assembly 110 held in position by a C-clamp 112. This height gauge includes a gauge member 114 contacting the edge of the work piece 100, so as to accurately measure the height of the work piece.

In the modification disclosed in Figure 15, the surface plate 20 has been provided with a pair of angle brackets 120 and 122, which extend along two sides of the surface plate and are held in position by bolts in a manner similar to the other angle brackets. The length of the angle bracket 120 is substantially equal to the width of the surface plate and the length of the angle bracket 122 is equal to the length of the surface plate plus the thickness of the bracket 120, so that the end of the angle bracket 122 overlaps and abuts the end of the angle bracket 120. This is found advantageous in some types of work.

Referring to the disclosure in Figure 16, a surface plate 20 has been mounted on edge on a suitable surface 124, which may be the work surface of another surface plate, the top of a work bench or any other suitable support. The surface plate 20 which has been mounted on edge may be used as an angle iron in connection with conventional surface plates now in use, in that the surface of the bosses 32 extend at right angles to the work surface of the surface plate 20.

Although the angle brackets have been shown as removably mounted, one or more angle brackets could be integral with the surface plate, so as to project upwardly along the side of the surface plate. In association with the integral angle bracket one or more removably mounted angle brackets may be used.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation, as disclosed and defined in the appended claims.

Having thus described my invention, I claim:

1. A surface plate assembly including a surface base plate having tripod supporting portions interconnected by a web-like truss network spanning the distance between the supporting portions and a plurality of marginally disposed downwardly projecting bosses interconnected to the web-like truss network by flange portions, an angle bracket having an abutment surface disposed at right angles to the work surface of the surface plate, said angle bracket including a pair of wing portions extending at right angles with respect to each other from the work surface of the surface plate, said wing portions having a wing surface parallel to but offset from the plane of the abutment surface so as to form shoulders between the abutment surface and the wing surface, one of said shoulders resting upon the edge of the surface plate, one wing portion extending downwardly so as to overlap and contact downwardly projecting bosses, and means for securing said wing portion to the bosses, the other wing portion extending in aligned relation with the outer edge of the surface plate.

2. A surface plate assembly including a surface base plate having a main body portion, tripod supporting portions, a web-like truss network for reenforcing the main body portion and interconnecting the supporting portions, said main body portion having a horizontal work surface bounded by downwardly directed bounding surfaces, means extending downwardly from the edges of the main body portion, said means presenting a surface flush with the surfaces bounding the work surface, and an angle bracket having a main body portion presenting an abutment surface disposed at right angles to the work surface of the main body portion of the surface plate, said angle bracket including a pair of wing portions, one wing portion extending downwardly in overlapping arrangement with said downwardly projecting means, and means for securing said downwardly extending wing portion to said downwardly projecting means, the other wing portion extending in a direction parallel to the work surface, said other wing portion having a surface common to the plane formed by one of said bounding surfaces.

3. A base plate assembly including a surface plate having a main body portion, tripod supporting means for supporting the main body portion, marginally disposed downwardly projecting connecting means integral with the main body portion, an angle bracket including an abutment surface extending at right angles to the work surface of the said main body portion, said angle bracket including a downwardly projecting wing portion, said wing portion having a surface offset from the plane of the abutment surface but parallel thereto, a shoulder intermediate the abutment surface and the wing surface, said shoulder resting upon the work surface of the main body portion, and means for interconnecting the wing portion to the main body portion so as to hold the angle bracket in fixed relation with respect to the main body portion.

4. A surface plate assembly including a surface plate having a horizontal work surface, said surface plate including tripod supporting means interconnected by a web-like truss network for reenforcing the main body portion and interconnecting the tripod supporting means, an angle bracket, and means for attaching the angle bracket to the main body portion, said angle bracket including a main body portion having an abutment surface and a pair of wing portions extending from the main body portion, said wing portions being disposed at right angles with respect to each other, said angle bracket including tripod supporting means terminating in a plane parallel to said abutment surface so that the angle bracket having said tripod supporting means resting upon the work surface of the surface plate presents the abutment surface in a plane parallel to the work surface.

5. A base plate assembly including a surface plate having a main body portion, tripod supporting means for supporting the main body portion, marginally disposed downwardly projecting connecting means integral with the main body portion, an angle bracket including an abutment surface extending at right angles to the work surface of the said main body portion, said angle bracket including a downwardly projecting wing portion, said wing portion having a surface offset from the plane of the abutment surface but parallel thereto, a shoulder intermediate the abutment surface and the wing surface, said shoulder resting upon the work surface of the main body portion, said wing portion having a plurality of elongated apertures, and means for interconnecting the wing portion to the main body portion so as to hold the angle bracket in fixed relation with respect to the main body portion, said means including retaining members extending through said elongated apertures which permit adjustment of the wing relative to the main body portion.

6. A surface plate assembly including a surface plate having a horizontal work surface, said surface plate including tripod supporting means interconnected by a web-like truss network for reenforcing the main body portion and interconnecting the tripod supporting means, an angle bracket, said angle bracket including a main body portion having an abutment surface, a pair of wing portions extending from the main body portion, each of said wing portions having elongated apertures, and means for attaching the angle bracket to said main body portion, said means including a plurality of bolts extending through said elongated apertures in one wing portion to clamp the same to the side of the surface plate, said elongated apertures permitting adjustment of the angle bracket relative to the surface plate.

7. A surface plate assembly including a surface plate having a work surface, tripod supporting portions for supporting said surface plate, a web-like truss network for interconnecting the tripod supporting portions and reenforcing the surface plate, a plurality of groups of downwardly projecting bosses, there being one group of bosses for each side and one group for each end of the surface plate, each group presenting a surface flush with the edge of the surface plate, and an angle bracket removably attached to selected bosses in any selected group of bosses, said angle bracket having an abutment surface projecting upwardly disposed at right angles with respect to the work surface of the surface plate.

8. A surface plate assembly including a surface plate having a work surface, tripod supporting portions for supporting said surface plate, a web-like truss network for interconnecting the tripod supporting portions and reenforcing the surface plate, a plurality of connecting means extending downwardly from the edges along the sides and the ends of the main body portion, each of said means presenting a flat surface lying in a plane normal to the plane of the work surface of the surface plate, a removably mounted angle bracket having a main body portion presenting an abutment surface disposed at right angles to the work surface of the main body portion of the surface plate, and means for removably securing said angle bracket to any selected downwardly extending connecting means so as to provide an abutment surface projecting upwardly along any edge of the main body portion of the surface plate.

9. A surface plate assembly including a surface plate having a work surface, tripod supporting portions for supporting said surface plate, a web-like truss network for interconnecting the tripod supporting portions and reenforcing the surface plate, a plurality of groups of downwardly projecting bosses, there being one group of bosses for each side and one group for each end of the surface plate, an angle bracket including an abutment surface extending at right angles to the work surface of the main body portion, said angle bracket including a downwardly projecting wing portion, and means for removably interconnecting the wing portion to any selected group of downwardly projecting bosses so as to provide an abutment surface projecting upwardly along any selected edge of the surface plate.

10. A surface plate assembly including a surface plate having a work surface, tripod supporting portions for supporting said surface plate, a web-like truss network for interconnecting the tripod supporting portions and reenforcing the surface plate, a plurality of connecting means extending downwardly from at least a part of the periphery of the main body portion, each of said means presenting a flat surface lying in a plane normal to the plane of the work surface of the plate, a removably mounted angle bracket having a main body portion presenting an abutment surface disposed at right angles to the work surface of the main body portion of the surface plate, and means for removably securing said angle bracket to any selected downwardly extending connecting means so as to provide an abutment surface projecting upwardly along any edge of the main body portion of the surface plate.

ALBERT B. REICH.